Oct. 14, 1958      J. P. STEFAN      2,855,909
VARIABLE TEMPERATURE SYSTEM

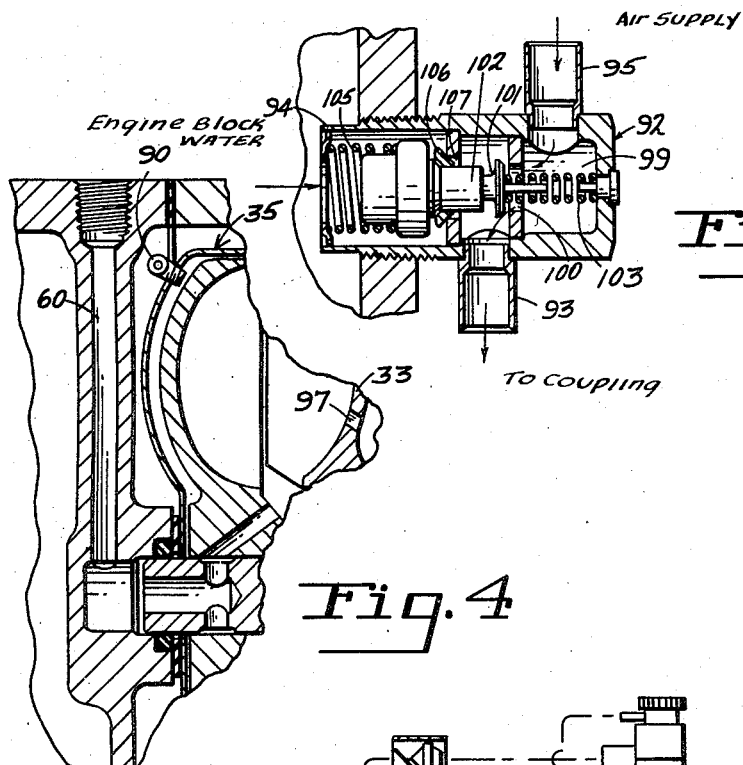
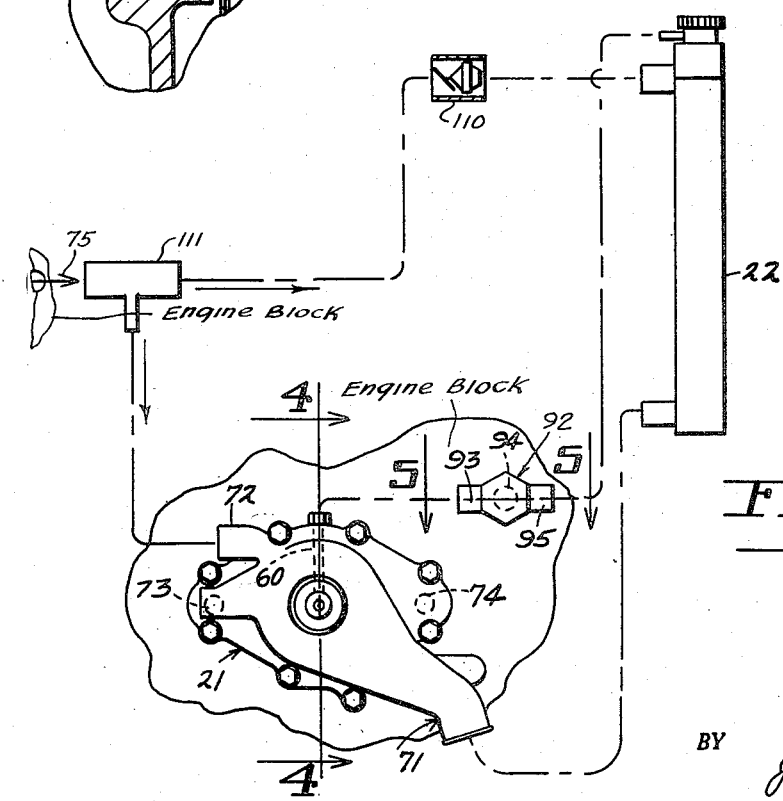

Filed Sept. 12, 1955      4 Sheets-Sheet 4

INVENTOR.
JOHN P. STEFAN.
BY E.C. McRae.
J.R. Faulkner.
F.H. Oster.
R.T. Seeger ATTYS.

2,855,909

VARIABLE TEMPERATURE SYSTEM

John P. Stefan, Detroit, Mich., assignor to Ford Motor Company, Dearborn, Mich., a corporation of Delaware Application September 12, 1955, Serial No. 533,568

6 Claims. (Cl. 123—41.12)

This invention relates to variable temperature systems and more particularly to automobile engine cooling systems.

In the past automobile engines have been cooled by circulating a coolant such as water alone or in combination with certain anti-rusting and/or anti-freezing compounds, and by having the engine turn a cooling fan which caused air to circulate rapidly about the engine. It takes a considerable amount of horsepower to drive the engine fan and also the fan causes certain undesirable noises. Since the fan is needed only at certain temperatures the horsepower saving and noise elimination could be accomplished if the fan could be automatically turned off when it is not needed and turned back on when it is needed.

It is an object of this invention to provide for automatically engaging and disengaging an engine fan when it is needed and not needed respectively.

An object of this invention to provide for automobile engine horsepower saving by disengaging the automobile engine cooling fan when it is not needed.

It is an object of this invention to provide for a quieter automobile engine by turning off the automobile engine fan when it is not needed.

It is a further object of this invention to provide for automatically engaging and disengaging an automobile engine fan by a comparatively simple, trouble-free durable hydraulic system.

It is also an object of this invention to provide for automatically engaging and disengaging an automobile engine fan in such a manner that if the more vulnerable point of the automatic system fails the system will fail safely or in other words a most serious damage done would be merely to engage the fan at all times. It is a further object of this invention to automatically engage and disengage automobile engine parts and accessories including generator, power-steering, and other automobile mechanisms that are needed only at certain automobile temperatures and speeds.

It is also an object of this invention to automatically change the ratio between the crank shaft and driven automobile engine parts and accessories advantageously as the automobile engine speed increases.

It is a further object of this invention to provide a vernier effect in controlling the automobile engine fan by automatically turning it only as fast as is necessary and as the conditions require to cool the engine.

Other important features and objects of the invention to which reference has not been made hereinabove will appear hereinafter when the following description and claims are considered with the accompanying drawings in which:

Figure 3 is a schematic view of an additional embodiment of this invention;

Figure 4 is a cross section taken at 4—4 of Figure 3;

Figure 5 is a cross section taken at 5—5 of Figure 3;

There is much public interest today to increase the horsepower of automobile engines yet to maintain the engine at its present size and to increase the engine economy. The automobile engine fan requires up to 15 horsepower to drive it. The above horsepower increase can be saved and engine gasoline economy can be realized if the fan is not used when it is not necessary. It is also desirable to increase acceleration in today's automobiles. By this invention, through provision of a fluid coupling to drive the engine fan, power devoted to turning the fan lags the increase in engine revolution frequency. It therefore allows more power to engine and automobile acceleration even when the fan is fluidly engaged.

Figure 1:
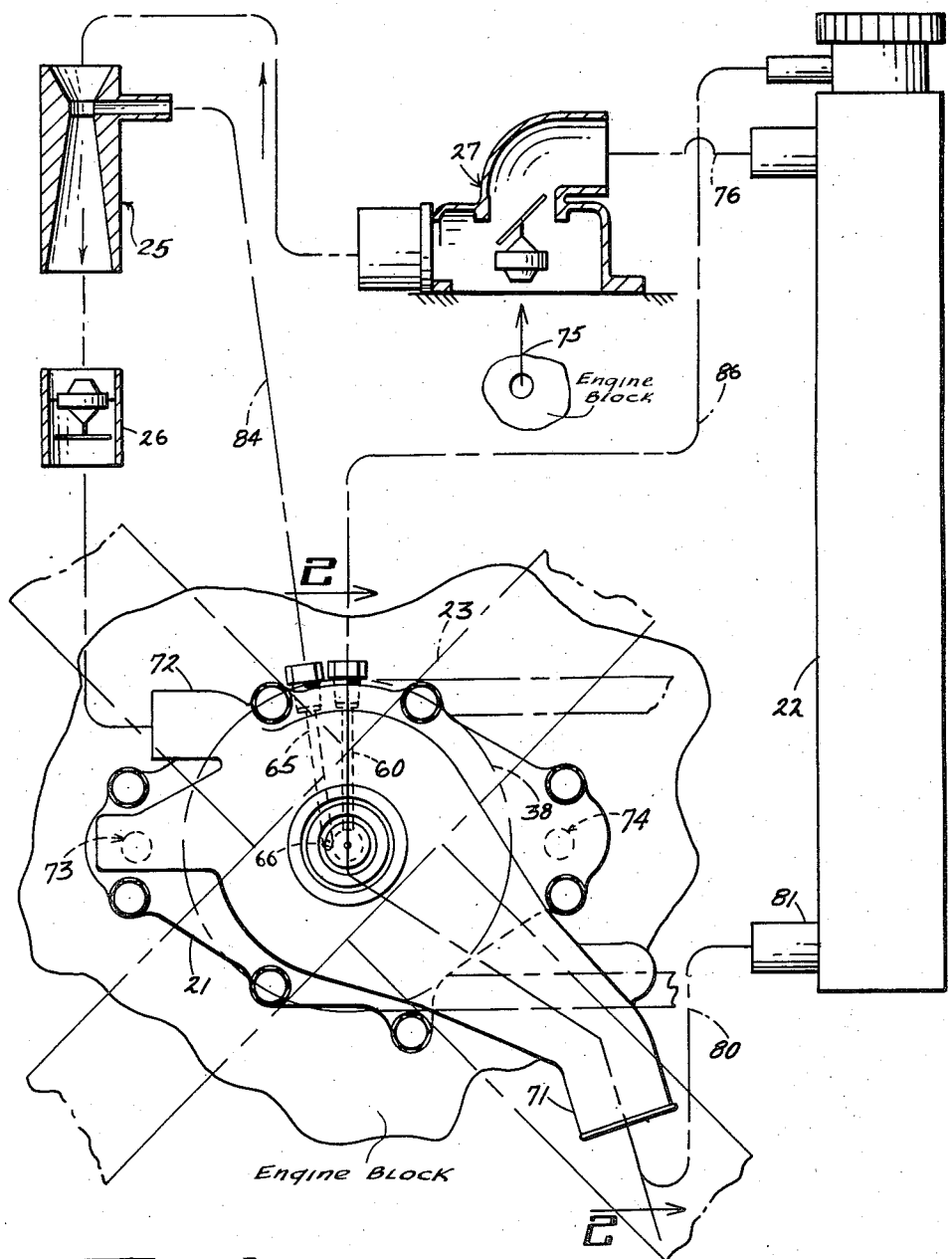
Figure 1 is a schematic view of an automobile cooling system.
Figure 2:
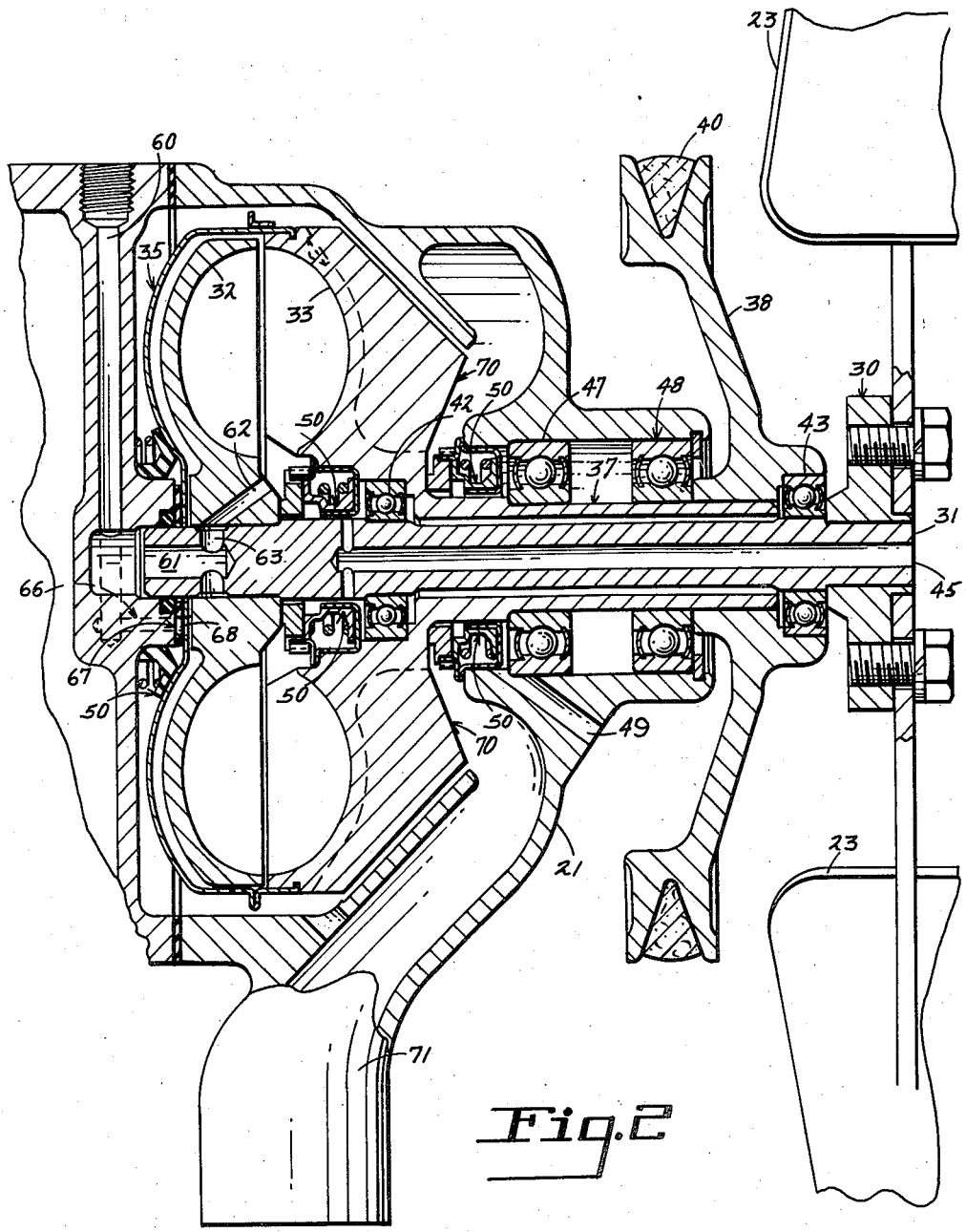
Figure 2 is a cross section taken at 2—2 of Figure 1.

In Figure 1 is shown a schematic view of an embodiment of this invention with the parts of the cooling system placed in a way so that operation of the system will be more apparent, although the placement of these parts will not necessarily be the same. In fact in an automobile engine the relative positions are not the same but the principle of operation is similar. In Figure 1 is seen a front view of a water pump 21, a side view of radiator 22, a diagrammatic view of fan 23 superimposed on pump 21, a diagrammatic view of aspirator 25, thermostat 26, engine thermostat 27 and connecting means between the various elements indicated by dash dot lines. In Figure 2 which is a cross section at 2—2 of Figure 1 through the water pump is seen fan 23 fixed to support 30 which is fitted on the shaft 31. Shaft 31 in turn is press fitted to turbine 32 which is turned by impeller 33 when there is fluid in the drive chamber therebetween. Shell 35 is press fitted to impeller 33 and rotates with it. Shell 35 encloses turbine 32 and separates the fluid in the drive chamber from the outside fluid in the water pump. Impeller shaft 37 is press fitted to pulley 38 which is turned by outside means not shown such as an automobile crank shaft which is connected to pulley 38 by means of elastic belt 40 or other satisfactory belt means. Shaft 31 is rotationally supported by race and ball bearings 42, 43. Shaft 31 has a central passage 45 which provides for excess liquid escape. Shaft 37 is rotationally supported by ball bearing and races 47, 48 which are permanently lubricated by confining a lubricant therein. Vent 49 allows an escape for any fluid leakage. Seals 50 tend to prevent water from leaking out of water pump cavities.

Air or vapor or both may be introduced and removed from the drive chamber through channel 60 which communicates with tube 61 and then through slot 62 into the drive chamber. Constant contact is made between tube 61 and slot 62 through annular space 63. Water is introduced to and removed from the drive chamber through channel 65 (Figure 1) which is adjacent to and coplanar with channel 60. Channel 65 communicates with the drive chamber through passage 66 which leads to annular ring 67 which is in constant communication with four holes 68 placed in shell 35. Holes 68 are placed equidistantly about the central portion of shell 35.

Fins 70 on impeller 33 are of the standard variety and cause water which comes from intakes 71, 72 to be forced through holes 73, 74 which lead to the engine block. Turbine 32 and/or impeller 33 may be made from molded plastics or powdered metal for economical production. The faces of turbine 32 and impeller 33 are of standard commercial variety and are designed to impart motion from one to the other.

Figure 6:
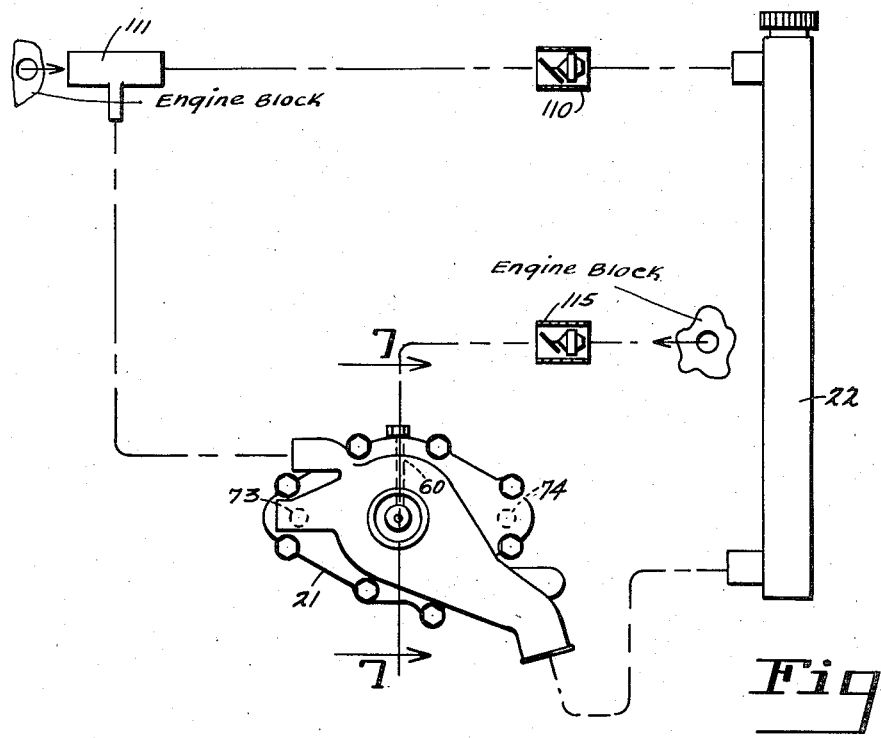
Figure 6 is a schematic view of an additional embodiment of this invention.

Looking now at Figure 1, the operation of an embodiment of this invention will be explained. Water is pumped through the system by means of water pump 21 and enters the schematic drawing in Figure 1 at point 75 whence it will enter aspirator 25 and/or radiator tube 76 depending upon the positions of thermostats 26, 27. In Figure 1 thermostat 26 is in a closed position and thermostat 27 is in an open position. The thermostats assume these positions when the engine is hot and it is desired to operate the cooling fan 23. In Figures 1, 3, and 6 arrow 75 represents water flow from the engine block. Water enters from the engine block at 75 with part of it going into aspirator 25 and part into radiator tube 76. The part going through radiator tube 76 flows through the radiator wherein it is cooled and then flows through pipe 80 leading from radiator outlet 81, then into water pump intake 71 and sent through cylinder block intake 73, 74 as is done in many of the cooling systems of today. The water flowing into aspirator 25 is forced through tube 83 since thermostat 26 is closed and sent through connecting means 84 into channel 65 and sent into the drive chamber through the passages previously described. Water entering the drive chamber forces the air or vapor or both out through channel 60 into air tube 86 which communicates with the upper portion of radiator 22. The drive chamber becomes filled with water and impeller 33 which is attached and driven from the crank shaft of the engine imparts rotational motion to turbine 32 which turns shaft 21 and fan 23.

To empty the drive chamber of water and hence stop the rotation of fan 23, thermostat 26 is opened and thermostat 27 is closed. This is done automatically through the temperature of the engine and engine water. As the temperature lowers to a predetermined level thermostats 26, 27 respectively open and close. The opening and closing of the thermostats may be staggered if desirable. This causes the water to flow from engine block at 75 into venturi tube 25 with none of it going into radiator tube 76 due to the closed position of thermostat 27. The high velocity of water flowing through aspirator 25 which is multiplied by the narrowed portion causes a withdrawing force in tube 83 and connecting means 84 and water from the drive chamber is drawn through channel 65. This water along with water from the engine block flows into intake 72 and is pumped by water pump 21 through engine block intakes 73, 74 and recirculated. As the drive chamber is emptied of water air is drawn from radiator 22 through tube 86 and channel 60 into the drive chamber. The drive chamber being evacuated the fan ceases to rotate. A small ring of water remains about the outer circumference of shell 35 and prevents air from being drawn to the water system. Even if air were drawn into the system it would be very small in amount. However water could be kept in the outer circumference of shell 35 by adding a corrugated ring near the outer circumference of shell 35. It is seen in Figure 1 that slot 66 and the end of channel 65 are not lower than the horizontal center line. This helps to prevent the water from being withdrawn from the central area thereby leaving some for lubrication.

In Figure 3 is shown a schematic view of another embodiment of this invention. In this embodiment there is only one channel leading to the drive chamber, that being channel 60. There are two aspirators 90 on shell 35 near its outermost circumference. These aspirators 90 communicate with the drive chamber. Of course the number of these aspirators may be varied as is desirable. The shell 35 is attached to impeller 33 which is driven off the crank shaft of the engine. There is a constant evacuating effect on the drive chamber when the crank shaft is rotating. Channel 60 is connected to two-way valve 92 at drive chamber coupling 93. Valve 92 is fastened to the engine block water system at port 94. Water flows into port 94 of valve 92 from the engine block. Valve 92 is also connected to the air supply of radiator 22 through radiator outlet 95. A small hole may be drilled in impeller 33 and in this embodiment the hole is .030 inch in diameter. The hole is shown at 97. In this embodiment valve 92 passes air from radiator 22 into the drive chamber when the engine is cold, thereby turbine 32 will be stationary. When the engine heats, the valve closes the air passage from radiator 22 and opens a water passage from the engine block filling the drive chamber with water causing turbine 32 to be rotated. Arrow 75 represents flow from the engine block. T section 111 directs part of the fluid to pump port 72 and part to thermostat 110. There is a constant evacuating effect on the drive chamber due to venturi 90 and hence there is no trouble in inducing water or air to flow from the valve into the drive chamber. The cross section of the valve is shown in Figure 5. Air may pass from valve 95 into compartment 99 through opening 100 and into outlet 93 which leads to the drive chamber with the valve in the position shown in Figure 5. The valve is in this position when the engine is cool and fan rotation is not desired. As the valve warms up stem 101 is forced from body 102 and compresses spring 103 until the stem head seats itself in opening 100 cutting off communication between outlets 95, 93. Further heating causes body 102 to move longitudinally compressing spring 105 and unseating beveled surface 106 from opening 107 allowing water to flow from cylinder block outlet through to drive chamber outlet 93. In this position of the two way valve water is drawn into the drive chamber causing the fan to rotate cooling the engine. Hole 97 allows more complete filling of the drive chamber with water by allowing trapped air to escape.

This embodiment is simpler and works more independently from the rest of the engine cooling system. When the engine is hot thermostat 110 opens allowing water from engine block to pass through T-connection 111 through to radiator 22 to intake 71 of water pump 21 and then through cylinder block intake 73, 74. When thermostat 110 is closed the radiator is by-passed and the water flows directly into intake 72 and then through cylinder block intake 73, 74. Since the opening of T connection 111 to intake 72 is more restricted than it is the opening to radiator 22 when thermostat 110 is opened the water will flow into the radiator.

In the schematic drawing shown in Figure 6 still another embodiment of this invention is represented. Here channel 60 of water pump 21 is connected to thermostat 115 which in turn is connected to a portion of the cylinder block water flow. Aspirators 90 are placed about the outer circumference or near the outer circumference of shell 35 in as large a number as is necessary to effectively evacuate the drive chamber. Channel 60 communicates with the drive chamber as is described in the first embodiment. Thermostat 115 opens when the engine is hot and the fan operation is desired. Aspirators 90 are connected to shell 35 which in turn is fastened to impeller 33 which is rotated by the crank shaft. There is an evacuation or withdrawing force exerted on this driving chamber when the crank shaft is revolving. Therefore upon opening of thermostat 115 water from the radiator is drawn into the drive chamber causing impeller 33 to rotate turbine 32 and hence fan 23. Upon the closing of thermostat 115 water is withdrawn from the drive chamber and due to the reduced pressure in the drive champer. Vaporization and air expansion takes place to effectively fill the chamber with gas and therefore turbine 32 ceases to rotate. This embodiment is comparatively simple and operates more independently from the rest of the automobile engine cooling system. Thermostat 110 and T connection 111 operates in conjunction with water pump and cylinder block substantially in the same manner as they do for the second described embodiment.

Figures 7, 8:
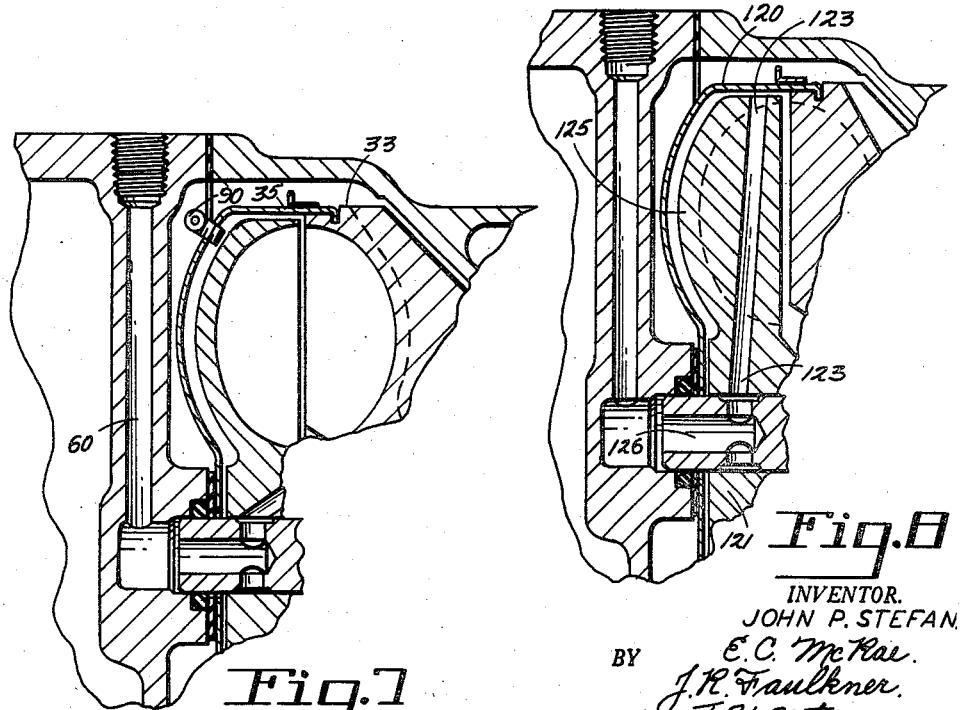
Figure 7 is a cross section taken at 7—7 of Figure 6.
Figure 8 is a view of another means for evacuating the drive chamber.

In the Figure 8 is shown a cross sectional view of a drive chamber equipped with an alternative means of evacuating the drive chamber. In this alternative method advantage is taken of the pressure differential between an outer circumference of shell 35 and an inner or central portion of shell 35. This embodiment evacuates the drive chamber without the use of an aspirator and may be used to advantage especially in the embodiments shown in Figure 3 and Figure 6. As impeller 33 and hence shell 35 rotates, water is forced to the outer circumference of shell 35 such as circumference 120 and at this point a considerable pressure build-up is realized. At inner circumference 121 there is a lower pressure and the difference between the pressures at circumferences 120 and 121 may be fifteen pounds per square inch at higher impeller speeds. By drilling hole 123 in turbine blade vane 125 the high and low pressure areas are connected and water is caused to flow from the outside or high pressure area toward the central or low pressure area and then to an outlet passage such as tube 126. This exerts an evacuating effect on the drive chamber when the impeller is turning and by controlling the opening and closing of tube 126 as in the embodiments shown in Figures 3 and 6 the drive chamber may be filled with or depleted of water. Slot 120 is connected to tube 126 by means of a sealed annular space about tube 126 with which slot 120 communicates. Holes may be drilled in as many vanes as is desired. By utilizing this pressure differential principle the pressures inside and outside of the drive chamber are more nearly equalized thereby easing the seal function.

The above described embodiment thermostats have been described as opening or closing when the engine is hot or cold. By hot and cold is meant respectively whether or not the engine fan is desired to run or not to run. The sensitive temperatures of the cooperating thermostats may overlap or not as is desired.

There is one condition when the engine temperature is high and the fan would normally be running under the above described embodiment when it would be desirable not to have the fan in operation. This condition exists when the automobile is traveling at a relatively high rate of speed and the air coming through the radiator grill makes unnecessary the rotation of the fan. The high rates of speed the water pump creates a relatively high pressure in the system and therefore a pressure sensitive valve may be placed in various points in the embodiment to cause the fan to stop at these high pressures. In the first embodiment in Figure 1 a pressure sensitive valve may be placed between the aspirator 25 and thermostat 26 or in the thermostat 26. When the water pressure reaches a predetermined level the valve would open thermostat 26 allowing water to flow through thereby causing aspirating action on tube 83 evacuating the chamber causing the fan to stop. When the water pressure decreases the valve will turn to its normal position and thermostat 26 will close causing water to return to the chamber.

In the third embodiment pictured in Figure 6 a pressure sensitive valve may be placed between thermostat 115 and radiator 22. When the water pressure reaches a predetermined level the valve will close thermostat 115 causing the drive chamber to be evacuated stopping the rotation of the fan.

The above described invention may be applied to other variable temperature systems and automobile parts and accessories that are desired to be thermostatically controlled.

Changes in construction will occure to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

I claim:

1. In an automobile engine cooling system wherein there are passages in the automobile engine for coolant to flow, where there is a coolant pump, a radiator, a radiator pipe connecting said engine passages and radiator, a radiator by-pass connecting said passages and said coolant pump, a radiator thermostat which at a predetermined temperature will close the pipe between said radiator and engine and direct coolant from engine passage through the coolant pump back to the engine passage, that improvement comprising in combination a driven member, an impeller, said impeller driven by said engine, a chamber containing said member and impeller, means for connecting said member with an engine fan designed to circulate air about said engine, said member coaxial with and axially spaced from said impeller, the facing surfaces of said impeller and said member designed so that upon introduction of fluid between said surfaces rotational force will be transmitted from said impeller face to said member face, a venturi, said venturi being located in said radiator by-pass, an aspirator tube, said tube connecting said venturi and said chamber, a by-pass thermostat, said thermostat being located between said venturi and said coolant pump, a chamber outlet pipe, said outlet pipe connecting said chamber with an upper portion of said radiator above the water level in said radiator.

2. The improvement claimed in claim 1 with the impeller coaxial with and driven by the coolant pump rotor.

3. The cooling system of claim 1 with pressure sensitive means in combination with said coolant pump thermostat whereby upon a predetermined water pressure said thermostat will open even though the engine temperature is above the thermostat closing temperature due to the high velocity of engine coolant impinging upon said means.

4. In an engine cooling system wherein a liquid is circulated throughout the engine by means of a coolant pump, that improvement comprising in combination a drive chamber, an impeller in said chamber drivably fixed to said pump, a fan member in said chamber, said impeller adapted to drive said fan member upon introduction of liquid into said chamber and to be disengaged from said fan member upon removal of said liquid from said chamber, means to introduce liquid from said system into said chamber at a given engine temperature, means to release liquid from said chamber at a given engine temperature, means to fill and deplete said chamber with air as said chamber is respectively depleted and filled with liquid, and means to empty said chamber of liquid when the coolant velocity as driven by said pump reaches a predetermined level.

5. In an engine cooling system wherein a liquid supply is circulated by means of a coolant pump, that improvement comprising a drive chamber, an impeller in said chamber drivably fixed to said pump, a fan member in said chamber, said impeller adapted to drive said fan member upon introduction of liquid into said chamber and to be disengaged from said fan member upon removal of said liquid from said chamber, an air supply, means operable to mutually exclusively place said chamber in communication with either said air supply or said liquid supply, said means including a coolant temperature-controlled valve, said valve operable at a first and lower predetermined coolant temperature to place said chamber in communication with said air supply and at a second and higher predetermined coolant temperature to place said chamber in communication with said liquid supply, aspirator means in said system operable to withdraw liquid from said chamber when said chamber is placed in communication with said air supply.

6. In an engine cooling system wherein a liquid supply is circulated by means of a coolant pump, that improvement comprising a drive chamber, an impeller in said chamber drivably fixed to said pump, a fan member in said chamber, said impeller adapted to drive said fan member upon introduction of liquid into said chamber and to be disengaged from said fan member upon removal of liquid from said chamber, an air supply, means operable to mutually exclusively place said chamber in communication with either said air supply or said liquid supply, said means including a coolant temperature-controlled valve, said valve operable at a first and lower predetermined coolant temperature to place said chamber in communication with said air supply and at a second and higher predetermined coolant temperature to place said chamber in communication with said liquid supply, chamber evacuating means, said evacuating means comprising a passage from a high pressure peripheral area of said chamber to the liquid supply thereby exerting a withdrawing force on said chamber due to the pressure differential between said high pressure area and said liquid supply.

References Cited in the file of this patent
UNITED STATES PATENTS

| | | |
|---|---|---|
| 1,256,709 | Ludeman | Feb. 19, 1918 |
| 2,289,440 | Kugel | July 14, 1942 |
| 2,406,486 | Bonham | Aug. 27, 1946 |